United States Patent
Ogata et al.

(10) Patent No.: US 9,225,650 B2
(45) Date of Patent: Dec. 29, 2015

(54) NETWORK SYSTEM, GATEWAY, AND PACKET DELIVERY METHOD

(71) Applicant: Hitachi, Ltd., Tokyo (JP)

(72) Inventors: Yuji Ogata, Saitama (JP); Masaki Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 13/932,444

(22) Filed: Jul. 1, 2013

(65) Prior Publication Data

US 2014/0016459 A1 Jan. 16, 2014

(30) Foreign Application Priority Data

Jul. 12, 2012 (JP) .................................. 2012-156265

(51) Int. Cl.
*H04L 12/26* (2006.01)
*H04L 12/801* (2013.01)

(52) U.S. Cl.
CPC ................ *H04L 47/12* (2013.01); *H04L 47/19* (2013.01)

(58) Field of Classification Search
CPC ..... H04L 45/00; H04L 45/02; H04L 61/1511; H04L 45/14; H04L 45/22; H04L 5/0048; H04W 24/08; H04W 24/02; H04W 24/10; H04W 16/14
USPC ................... 370/252, 235, 232, 230; 709/238
See application file for complete search history.

(56) References Cited

U.S. PATENT DOCUMENTS

| | | | |
|---|---|---|---|
| 7,849,213 B1 * | 12/2010 | Borghetti ....................... 709/238 |
| 8,374,090 B2 * | 2/2013 | Morrill et al. .................. 370/235 |
| 8,675,659 B2 * | 3/2014 | McNamee et al. ............. 370/392 |
| 2005/0111453 A1 | 5/2005 | Mizutani |
| 2009/0310485 A1 * | 12/2009 | Averi et al. ..................... 370/232 |
| 2010/0135287 A1 * | 6/2010 | Hosain .................... H04L 47/10 370/389 |
| 2011/0238821 A1 | 9/2011 | Matsuo |
| 2012/0320928 A1 | 12/2012 | Takada et al. |

FOREIGN PATENT DOCUMENTS

| | | |
|---|---|---|
| JP | 2005-159430 A | 6/2005 |
| JP | 2011-198284 A | 10/2011 |
| WO | WO 2010/129275 A2 | 11/2010 |
| WO | WO 2011/102317 A1 | 8/2011 |

* cited by examiner

*Primary Examiner* — Andrew Chriss
*Assistant Examiner* — Atique Ahmed
(74) *Attorney, Agent, or Firm* — Foley & Lardner LLP

(57) ABSTRACT

A gateway suppresses data volume considering processing load information of a destination to reduce communication traffic volume of a network without suppressing the information with high severity. In a network system comprising the data center, the management node and the gateway connected via a plurality of networks, a communication function section of the gateway includes a table control unit that receives the processing load information of the data center as a packet destination from the management node and retains the information in a transfer management table. A transfer stop control unit of the gateway judges whether or not transfer of the packet is suppressed using the processing load information retained in the transfer management table, and suppresses the transfer of the predetermined packet upon judgment to suppress the packet transfer.

3 Claims, 13 Drawing Sheets

FIG. 6

| SOURCE IP ADDRESS | SOURCE PORT NO. | IDENTIFICATION ID | FLOW CODE | PRIORITY BASED ON PACKET ANALYSIS |
|---|---|---|---|---|
| SIPa | SPa | IDa1 | flow0 | 1(low) |
| SIPa | SPa | IDa2 | flow1 | 2(middle) |
| SIPb | SPb | IDb1 | flow2 | 3(high) |
| ... | ... | ... | ... | ... |

61, 62, 63 — search key
64, 65 — result
509

| 701 FLOW CODE | 702 DESTINATION DC CODE | 703 DESTINATION IP ADDRESS | 704 DESTINATION PORT NO. | 705 DESTINATION PRIORITY COMMAND | 706 TRANSFER AMOUNT TRANSFER STOP COMMAND | 707 TRANSFER STOP COMMAND FOR low | 708 TRANSFER STOP COMMAND FOR middle | 709 TRANSFER STOP COMMAND FOR high | 710 LOAD INFORMATION | 711 TRANSFER AMOUNT | 712 PACKET ANALYSIS RESULT PRIORITY | 713 TRANSMISSION PRIORITY | 714 TRANSFER POSSIBILITY |
|---|---|---|---|---|---|---|---|---|---|---|---|---|---|
| flow0 | DCa | DIPa | DPa | 1(low) | 100pps | 70% | 80% | 95% | 60% | 10pps | 1(low) | 1(low) | active |
| flow0 | DCx | DIPx | DPx | 1(low) | 150pps | 70% | 80% | 95% | 90% | 100pps | 1(low) | 1(low) | stop |
| flow1 | DCa | DIPa | DPa | 2(middle) | 30pps | 70% | 80% | 95% | 60% | 50pps | 2(middle) | 4(middle) | stop |
| flow2 | DCb | DIPb | DPb | 2(middle) | 30pps | 70% | 80% | 95% | 40% | 50pps | 3(high) | 6(middle) | active |
| flow2 | DCx | DIPx | DPx | 3(high) | 100pps | 70% | 80% | 95% | 90% | 10pps | 3(high) | 9(high) | active |
| ... | ... | ... | ... | ... | ... | ... | ... | ... | ... | ... | ... | ... | ... |

715 search key: 701
716 SET VALUE: 702–709
717 STATUS: 710–714

NETWORK SYSTEM, GATEWAY, AND PACKET DELIVERY METHOD

CLAIM OF PRIORITY

The present application claims priority from Japanese patent application JP2012-156265 filed on Jul. 12, 2012, the content of which is hereby incorporated by reference into this application.

BACKGROUND OF THE INVENTION

The present invention relates to a network system, and more particularly, the present invention relates to technology for performing packet delivery through the gateway connected to the wide-area network.

Along with the trend of high-speed processing in the wider area, application field of the information communication network has been expanding. Generally, the system is established in a geographically limited place. Meanwhile, a large-scale network system via the wide area network has been envisioned. For example, a cloud service for social infrastructure is thought to be a typical system using the aforementioned information communication network for monitoring based on the information concerning regional events such as environment, weather, disaster prevention and crime prevention so as to provide appropriate information and services based on monitored results.

In order to realize the cloud service, it has been thought that use of information on the sensor installed on site shared by a plurality of cloud services ensures cost reduction compared with individual provision of sensors for the respective purposes of the service. Compared with reception/transmission of the predetermined information between the cloud services, transfer of the sensor information to the appropriate cloud service by the network system through autonomous interpretation of such information is thought to allow the sensor information to be shared without using particular means for the application.

Actually, IP multicast communication, and L7 packet communication as disclosed in JP-A-2005-159430 have been employed for transferring the packet that includes the sensor information through autonomous interpretation to a plurality of destinations. When sharing the information among the cloud services by transferring the packet to a plurality of destinations, it is necessary to prevent increase in both communication traffic volume and information processing load on the network.

For example, JP-A-2005-159430 discloses the method of improving delivery efficiency by allowing the gateway to identify the path of the network system using the identifier identified by the application layer, and reducing the network load upon data delivery for the purpose of reducing the load on the network when delivering large volumes of data to a plurality of places simultaneously.

In view of the problem of increase in the communication traffic volume on the network, JP-A-2011-198284 discloses the method of suppressing transmission of the content performed by the node device if it is judged that data volume exceeds a predetermined value for the purpose of preventing excessive transmission of the content from the predetermined network to the other network.

WO2011/102317 discloses the method of reducing the communication traffic volume by performing data compression and filtering in accordance with data severity and the band status of the network provided by the network connection unit as a result of analysis of the content of incoming data to the network connection unit.

BRIEF SUMMARY OF THE INVENTION

The cloud service is established by connecting the sensor provided on site to the data center via the wide area network. Development of the cloud service has increased the communication traffic volume of the wide area network and the information throughput of the data center.

There may be the case where the information throughput of the data center as the transfer destination is brought into an overload state irrespective of the data volume for transfer. If the information throughput of the transfer destination becomes excessively large, it may be difficult to continue the information processing unless the data volume is suppressed.

The method as disclosed in JP-A-2011-198284 and WO2011/102317 is intended to suppress data volume in view of communication traffic volume of the network and contents of the packet. If the data center as the transfer destination is overloaded, the transfer is continued. The data volume may be suppressed by means only of the address information of the destination. This may cause the problem of suppressing the information with higher severity to the transfer destination with the same address information. In the system configured to detect the overload state at the data center side as the transfer destination and drop the packet, the originally unnecessary packet is transmitted to the network, resulting in the problem of wasting the network band.

The present invention provides the network system, gateway, and packet delivery method for reducing the communication traffic volume without suppressing the information with high severity in view of the processing load information of the transfer destination.

The present invention provides a network system comprising a data center and a gateway connected via a network. The gateway receives processing load information of the data center, and judges whether or not transfer of a received packet is suppressed based on the received processing load information, and suppresses the transfer of the packet upon judgment to suppress the transfer of the packet.

The present invention provides a gateway connected to a destination via a network, which includes a storage unit and a processing unit. The storage unit stores externally received processing load information of the destination. The processing unit judges whether or not transfer of a packet received via the network is suppressed based on the processing load information stored in the storage unit, and suppresses the transfer of the packet upon judgment to suppress the transfer of the packet.

The present invention provides a packet delivery method for a network system comprising a destination of a packet, a management node and a gateway connected via a network. The gateway receives processing load information of the destination, judges whether or not transfer of the received packet is suppressed based on the received processing load information, and suppresses she packet transfer upon judgment to suppress the packet transfer.

Advantages derived from the representative example of the present invention will be briefly described hereinafter. The network system for transferring the packet to a predetermined destination allows the gateway to suppress data volume in consideration of the processing load information of the transfer destination so as to ensure reduction in the communication traffic volume of the network without suppressing the information with high severity.

BRIEF DESCRIPTION OF THE DRAWINGS

FIG. 6 is an explanatory view showing a flow decision table according to the first example;

FIG. 7 is an explanatory view showing a transfer management table according to the first example;

DETAILED DESCRIPTION OF THE INVENTION

Embodiment

An embodiment of the present invention will be described referring to FIGS. 1 to 16. A representative example of the present invention is configured as a network system comprising a data center, a management node and a gateway connected via a plurality of networks. The gateway includes a table control unit that receives the processing load information of the data center via the management node so that the information is retained in the transfer management table, and a transfer stop control unit that judges whether or not transfer of the received packet is suppressed, and suppresses the packet transfer based on the judgment to suppress the packet transfer.

First Example

Figure 1:
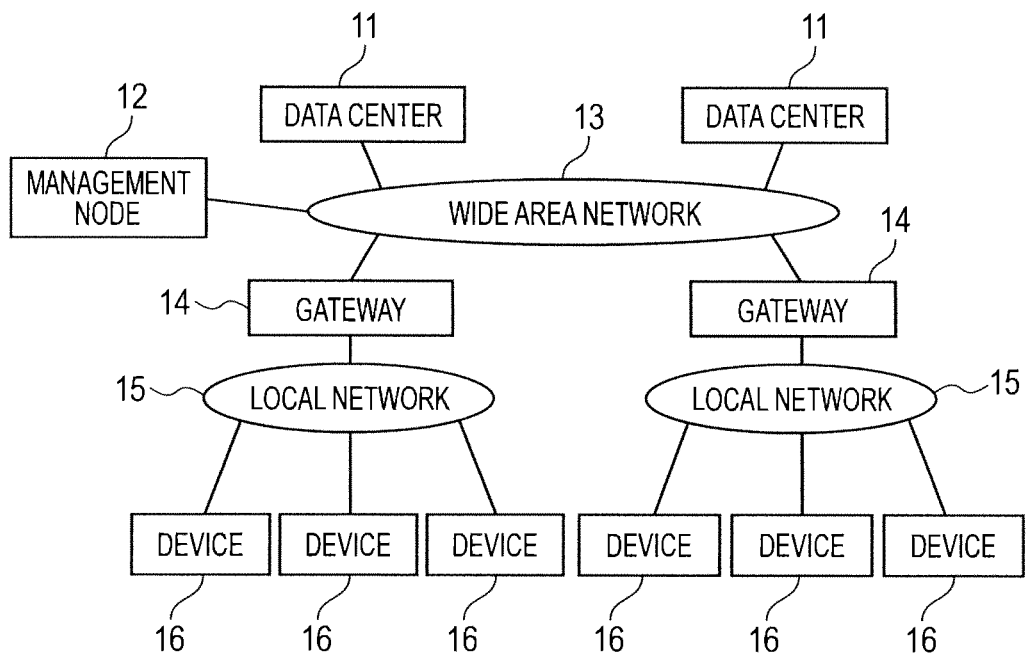
FIG. 1 is an explanatory view showing an exemplary structure of a network system according to a first example.

FIG. 1 is an explanatory view showing a structure of the network system according to a first example. The network system of this example has a data center 11, a management node 12, and a gateway 14 which are connected with one another via a wide area network 13.

Devices 16 are connected to the gateway 14 via a local network 15. The device 16 is a general term that refers to the device for transmitting and receiving data including various types of devices, for example, mobile phones, personal computers and cameras.

The gateway 14 is connected to the devices 16 via the local network, serving as a sophisticated network node provided with functions for judgment processing and arithmetic processing in addition to the communication function for data transmission to and reception from the device 16.

Figure 5:
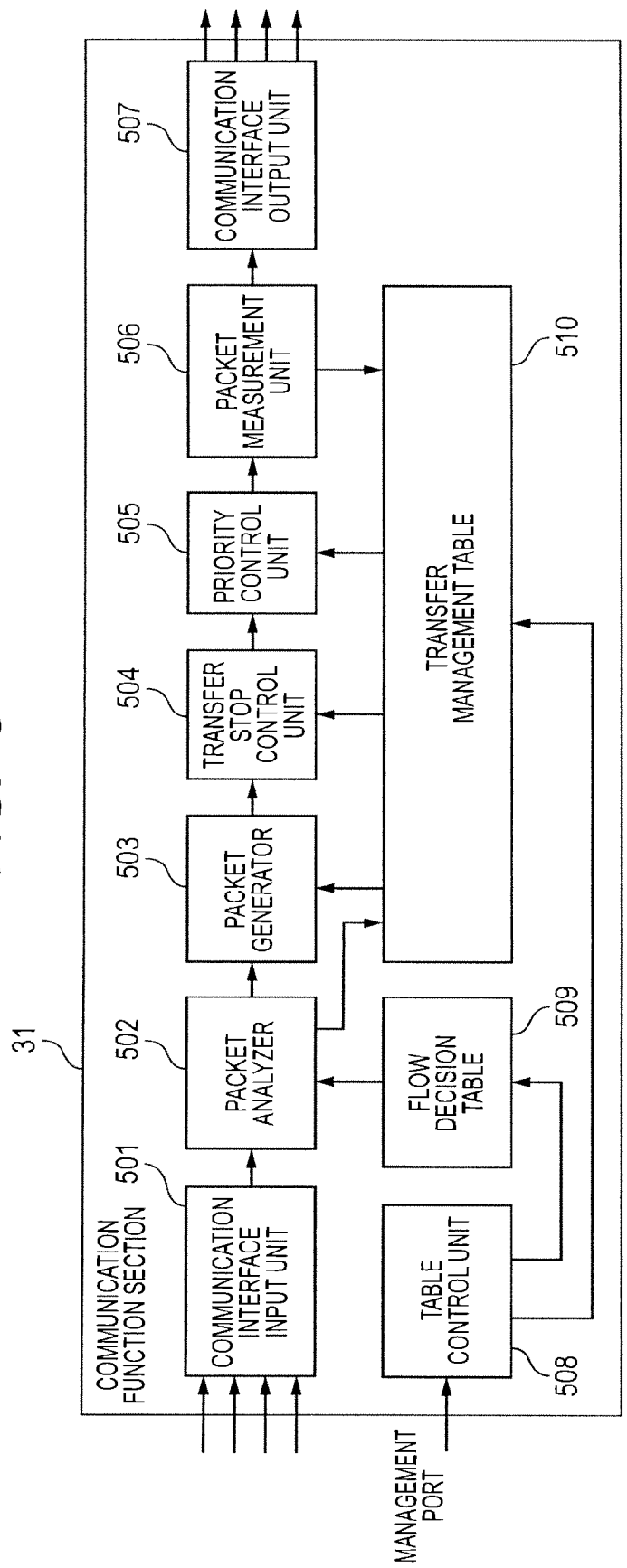
FIG. 5 is an explanatory view showing a structure of a communication function section according to the first example.

The management node 12 provided with a general computing configuration aggregates the communication traffic volumes of the wide area network 13 and the local network 15, and information on the processing payload of the data center 11 for setting the gateway 14. In other words, the management node 12 serves as the node for providing the function that allows owners and managers of the data center 11, the gateway 14, and the device 16 to operate them. The node sets addresses of the data center 11, the gateway 14 and the device 16, and further sets and reads a flow decision table 509 and a transfer management table 510 as shown in FIG. 5 to be described later.

Referring to FIG. 1, the explanation will be made using the structure having the management node 12 independently connected to the wide area network 13. The function of the management node may be performed in accordance with the management program executed by the data center 11. That is, the system may be configured that the management program for setting the information on the processing payload of the data center 11 for the gateway 14 is executed by the data center 11 without using the management node 12. In this case, however, it is assumed that the "management node" herein includes the function of the management node performed by the data center 11.

The data center 11 transmits and receives data to and from the device 16, stores various collected data, or executes the arithmetic processing based on the various data.

The information throughput of the data center 11 may be brought into the overload state irrespective of the communication traffic volume to the data center 11 depending on the content of the information processing. In the judgment process executed by the gateway 14 for suppressing the packet from the device 16 via the management node 12 using only the information on communication traffic volume, the system may fail to suppress the packet transmitted to the data center 11.

The structure of the example allows the gateway 14 to reduce the packet transmitted to the data center 11 that suffers from excessive processing load by suppressing the packet in consideration of the processing load information of the data center 11 as the destination. It is clear that the numbers of the data centers 11, the wide area networks 13, she gateways 14, the local networks 15, and the devices 16 are not limited to the respective numbers of those units as shown in FIG. 1.

Figure 2:
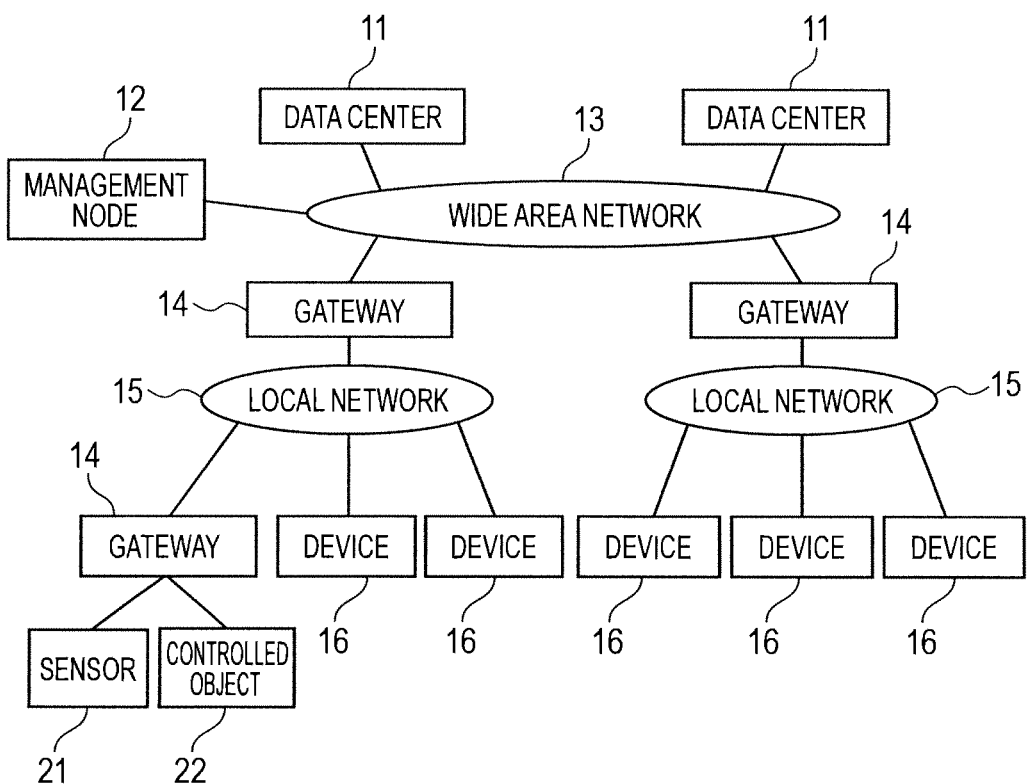
FIG. 2 is an explanatory view showing a modified example of the network system structure according to the first example.

FIG. 2 is a view showing a modified example of the network system structure according to the first example.

The network system shown in FIG. 2 is configured to have a sensor 21 and a controlled object 22 connected thereto via the gateway 14 connected to the local network 15. The gateway 14 is the sophisticated network node with judgment processing function and the arithmetic processing function in addition to the communication function for transmitting and receiving data between the sensor 21 and the control object 22.

The sensor 21 is a general term that refers to the mechanism for converting physical information such as temperature and voltage value into signals, including a wide variety of devices, for example, the temperature sensor, humidity sensor, vibration sensor, pressure sensor, motion sensor, microphone and camera. The control object 22 is a general term that refers to the mechanism for converting the input signal into the physical motion, including a wide variety of devices, for example, alarms, opening/closing switches, and motors. Likewise the description referring to FIG. 1, the numbers of the data centers 11, wide area networks 13, gateways 14, local networks 15, devices 16, sensors 21 and control objects 22 are not limited to those of the respective units shown in FIG. 2.

Figure 3:
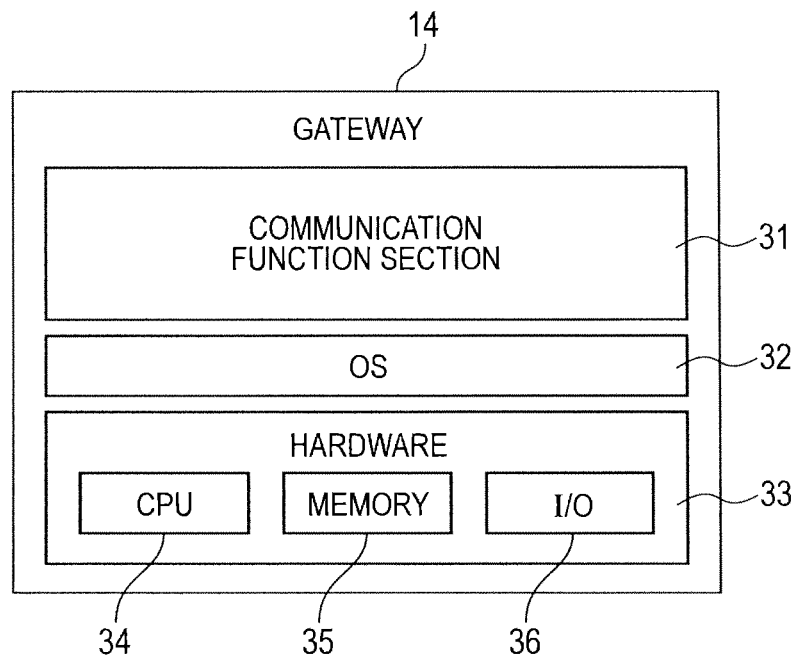
FIG. 3 is an explanatory view showing a structure of a gateway according to the first example.

FIG. 3 is an explanatory view showing an exemplary structure of the gateway 14 of the network system according to this example.

The gateway 14 includes hardware 33 such as a central processing unit (CPU) 34, a memory 35 and an input/output unit (I/O) 36. The CPU 34 is a processing unit for executing various types of arithmetic processing. The memory 35 is a storage unit for storing various programs and data. The I/O 36 is an interface to the wide area network 13, the local network 15, the device 16, the sensor 21 and the control object 22. The gateways 14 are connected with each other via the I/O 36 for communication through the wide area networks 13 and the local networks 15.

An operating system (OS) 32 as the upper layer of the hardware 33 is operated by the CPU 34.

A communication function section 31 as the upper layer of the OS 32 is realized by the CPU 34 for executing the corresponding program. In other words, the gateway 14 is a computing device with the communication function section 31.

The communication function section 31 analyzes packets from the device 16 and the sensor 21 so as to judge with respect to suppression of the packet and control priority, and to measure communication traffic volume based on set values from the management node 12. The communication function section 31 receives and transmits packets not only from the device 16 and the sensor 21 but also from the other gateway 14.

Figure 4:
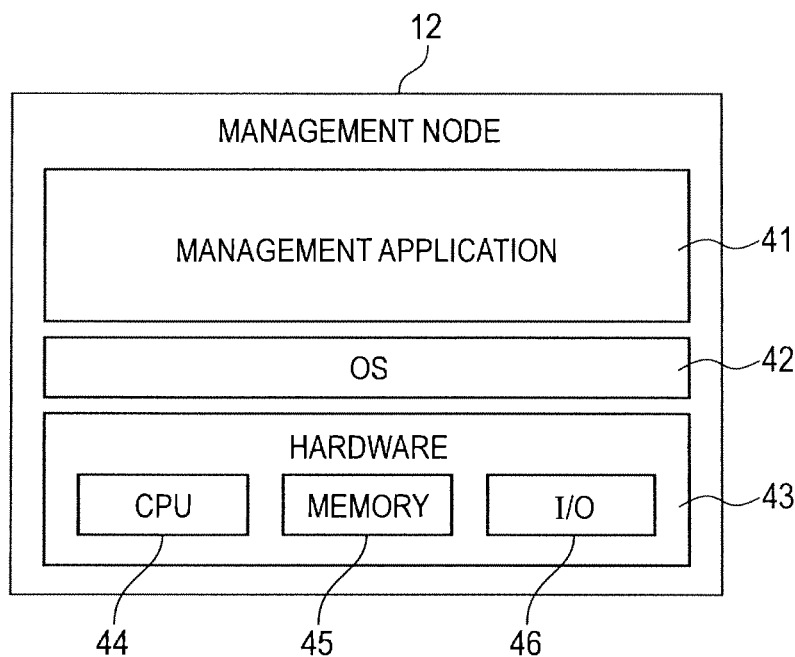
FIG. 4 is an explanatory view showing a structure of a management node according to the first example.

FIG. 4 is an explanatory view showing an exemplary structure of the management node 12 according to the first example.

The management node 12 includes hardware 43 such as a central processing unit (CPU) 44, a memory 45, and an input/output unit (I/O) 46. The CPU 44 is a processing unit for executing various arithmetic processing. The memory 45 is a storage unit for storing various programs and data. The I/O 46 is an interface to the wide area network 13.

An operating system (OS) 42 as the upper layer of the hardware 43 is operated by the CPU 44.

A management application 41 as the upper layer of the OS 42 is realized by the CPU 44 for executing the corresponding program. In other words, the management node 12 is a computing device that executes the management application 41.

Figure 12:
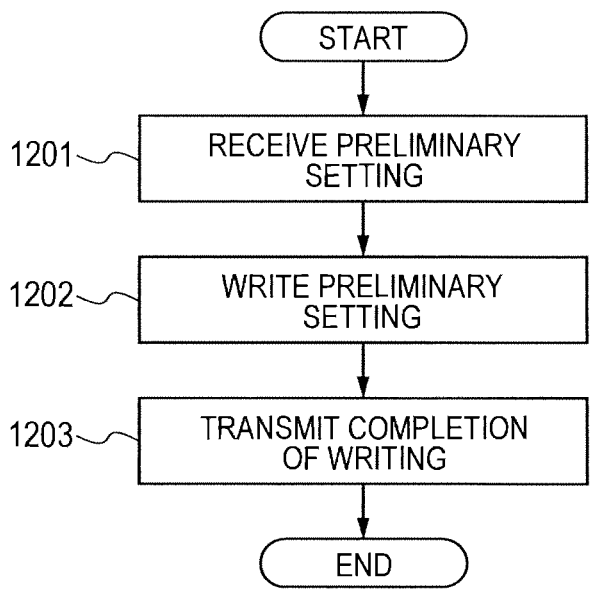
FIG. 12 is a flowchart of the process for preliminarily setting the flow decision table and the transmission management table executed by a table control unit of the communication function section according to the first example.
Figure 13:
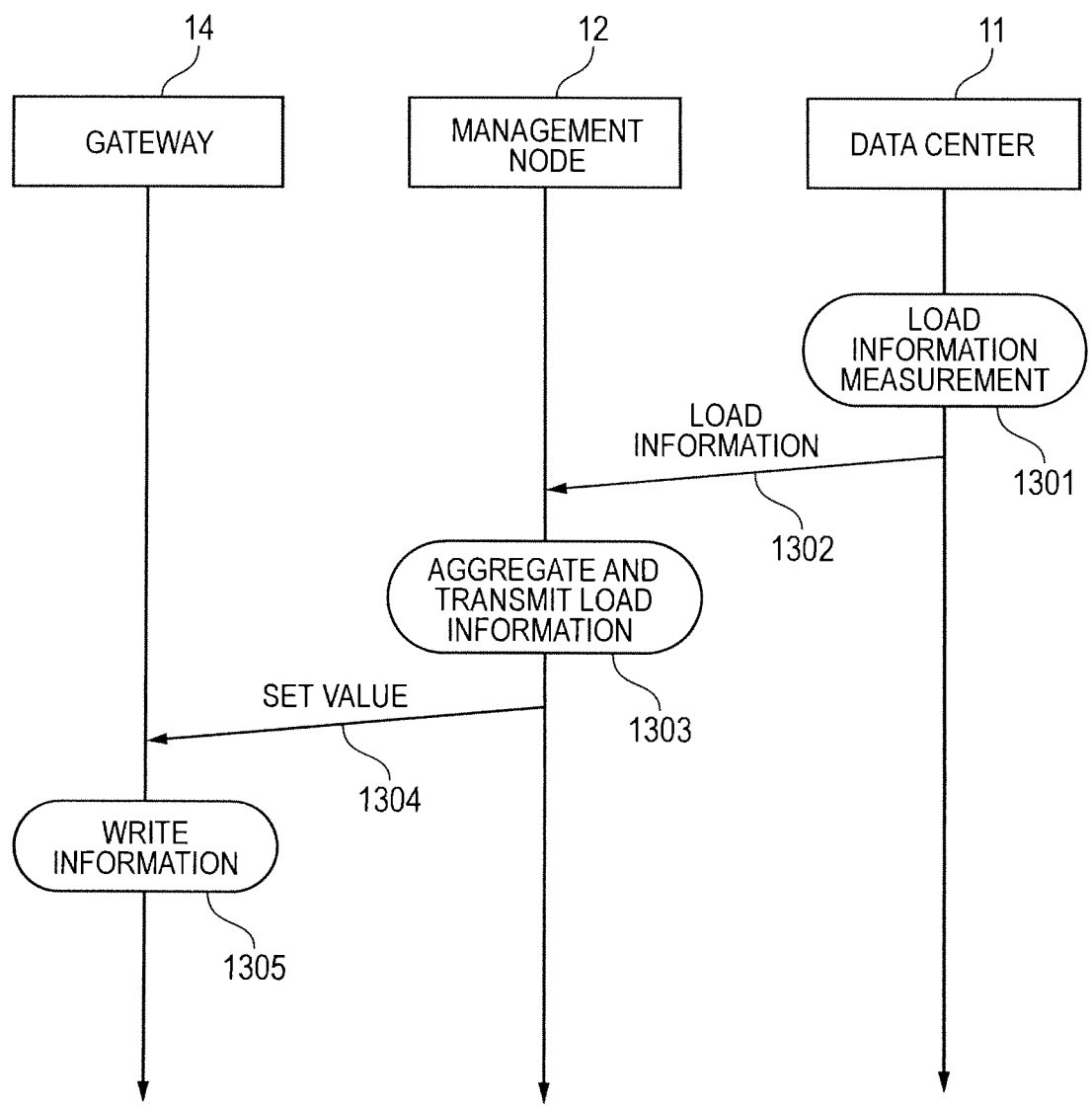
FIG. 13 is a view showing an example of a sequence for informing the gateway of the value set by the management node according to the first example.
Figure 14:
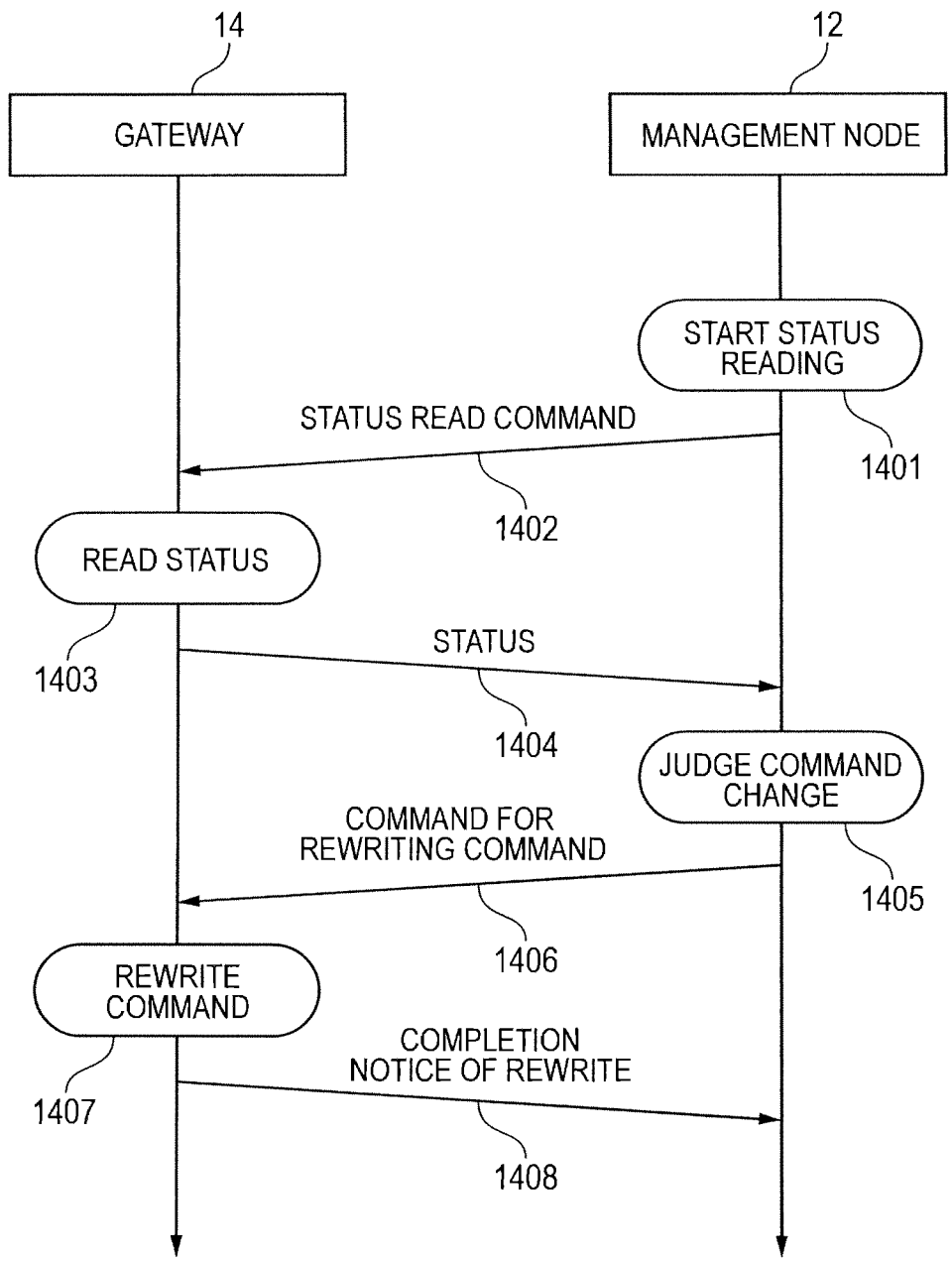
FIG. 14 is a view showing an example of the sequence of the process for reading the status and the process for rewriting commands executed by the management node according to the first example.

The management application 41 includes application for the processing of preliminarily setting various tables shown in FIG. 12, the processing of aggregating and transmitting the load information as shown in FIG. 13, and the process of starting the status reading and judging the command change as shown in FIG. 14.

FIG. 5 is an explanatory view of an exemplary functional structure of the communication function section 31 of the gateway 14 according to the example.

The communication function section 31 includes a communication interface input unit 501, a packet analyzer 502, a packet generator 503, a transfer stop control unit 504, a priority control unit 505, a packet measurement unit 506, a communication interface output unit 507, a table control unit 508, a flow decision table 509, and a transfer management table 510. As described above, the respective functional blocks of the communication function section 31 as the upper layer of the OS 32 are realized by the CPU 34 for executing the corresponding program. The tables 509 and 510 shown in FIG. 5 are stored in the memory 35. The communication interface input unit 501 and the communication interface output unit 507 correspond to the I/O 36.

The communication interface input unit 501 and the communication interface output unit 507 are connected to the wide area network 13 and the local network 15 for transmitting and receiving packets. Referring to the structure shown in FIG. 5, the table control unit 508 individually includes a management port, and is connected to the management node 12. The table control unit may be connected to the management node 12 via the wide area network 13 and the local network 15.

The packet analyzer 502 analyzes contents of the packets from the wide area network 13 and the local network 15 based on contents of the flow decision table 509. The packet analyzing method will be described in detail referring to FIG. 6, and an example of the packet format will be described in detail referring to FIG. 8.

The packet generator 503 generates packets based on contents of the transfer management table 510. The packet generating method will be described in detail referring to FIG. 7.

The transfer stop control unit 504 stops transfer of the packet based on the content of the transfer management table 510. The packet transfer stop method will be described in detail referring to FIGS. 1, 9 and 10.

The priority control unit 505 judges the priority of the packet transfer based on the contents of the transfer management table 510. The method of judging the packet priority will be described in derail referring to FIGS. 7, 9, 10 and 11.

The priority control unit 505 judges the packet priority, and distributes the packets to queues provided by priority for the purpose of preferentially sending the packet with higher priority. The function for distributing the packets to the queues by priority will be described, referring to FIGS. 15 and 16. In FIG. 5, the structure of the queue of the communication function section 31 is omitted. Any method of executing the priority control other than the one described referring to FIGS. 15 and 16 may be employed, for example, the method that allows occupancy of the transmission band by the packet with higher priority may be employed.

The priority control unit 505 shown in FIG. 5 is configured to set the information indicating priority to Type of Service (TOS) field and Virtual Local Area Network (VLAN) tag of the packet to be sent so as to ensure that the priority information is carried on into another gateway 14 which constitutes the network system, and routers and switches which constitute the local network 15 and the wide area network 13.

The packet measurement unit 506 measures the communication traffic volume per destination of the packet, and accumulates measurement results in the transfer management table 510. Measurements of packets are accumulated using such unit as bit per second (bps) and communication traffic volume per predetermined time (byte). The unit is not limited to those described above, but may be defined as various values, for example, maximum value or minimum value of the communication traffic volume, and an integrated value calculated from the predetermined time.

The table control unit 508 is connected to the management node 12 as described above, and reads from and enters into the flow decision table 509 and the transfer management table 510. Explanation of the operation will be described in detail referring to FIGS. 12, 13 and 14. FIG. 6 is an explanatory view of the flow decision table 509 of the gateway 14 according to the example. As described above, the flow decision table 509 is stored in the memory 35 of the gateway 14.

Referring to the drawing, she flow decision table 509 includes a source IP address 61, a source port number 62, an identification ID 63, a flow code 64, and a priority based on packet analysis 65. An IP address of the source that sends the packet to the gateway 14 is registered in the source IP address 61. A port number of the source that sends the packet to the gateway 14 is registered in the source port number 62. The source may be one of the device 16, the sensor 21, the control object 22, and the data center 11. The identification ID 63 refers to information included in the packet sent to the gateway 14, which is identified using numerals and strings.

The packet analyzer 502 obtains the flow code 64 and the priority based on packet analyses 65 based on the source IP address 61, the source port number 62, and the identification ID 63 which are included in the flow decision table 509. The flow code 64 is set for each packet sent to the gateway 14 using numerals and strings. The priority based on packet analysis 65 refers to the priority information set for each packet sent to the gateway 14 using numerals and strings.

Contents included in the packet sent to the gateway 14 may be set in the flow decision table 509, for example, priority information and position information included in the packet, information types such as sensor type, measurement data type and unit, or data values of temperature, voltage, current and water quantity. The contents are not limited to those shown in FIG. 6. An example of the packet sent to the gateway 14 will be described in detail referring to FIG. 8.

FIG. 7 is an explanatory view showing an example of the transfer management table 510 of the gateway 14 according to the example. As described above, she transfer management table 510 is stored in the memory 35 of the gateway 14.

The transfer management table 510 includes a flow code 701, a destination DC code 702, a destination IP address 703, a destination port number 704, a destination priority command 705, a transfer amount transfer stop command 706, a transfer stop command for low 707, a transfer stop command for middle 708, a transfer stop command for high 709, a load information 710, a transfer amount 711, a packet analysis result priority 712, a transmission priority 713 and a transfer possibility 714.

The flow code 701 refers to a candidate flow code for the packet generated by the gateway 14 among the flow codes 64 of the flow decision table 509 as described above, which is set using numerical values and strings. The gateway 14 has the function of analyzing the incoming packet, and generating packets to a plurality of destinations. Entries are made into the transfer management table 510 corresponding to the number of destinations.

The packet analyzer 502 of the gateway 14 analyzes the content of the incoming packet to obtain the flow code designated as flow0. The packet generator 503 searches the entry of the obtained flow code flow0, and generates the packet based on the corresponding information using such information as the destination DC code 702, the destination IP address 703, and the destination port number 704.

A description of the destination of the packet sent to the gateway 14 is registered in the destination DC code 702. The IP address of the destination of the packet sent to the gateway 14 is registered in the destination IP address 703. A port number of the destination of the packet sent to the gateway 14 is registered in the destination port number 704. The priority of the communication required by the destination is registered in the destination priority command 705.

Threshold values for suppressing packet transmission are registered in the transfer amount transfer stop command 706. When the value of the transmission priority 713 is "low", the threshold value for suppressing the packet transmission is registered in the transfer stop command for low 707. When the value of the transmission priority 713 is "middle", the threshold value for suppressing the packet transmission is registered in the transfer stop command for middle 708. When the value of the transmission priority 713 is "high", the threshold value for suppressing the packet transmission is registered in the transfer stop command for high 709.

The processing load information of the destination is registered in the load information 710. The transfer amount of the packet to the destination is registered in the transfer amount 711. The transmission priority which has been judged based on the destination priority command 705 and the priority based on packet analysis 65 is registered in the packet analysis result priority 712. The information indicating the transfer possibility that has been judged based on the transfer amount and the priority is registered in the transfer possibility 714.

The flow code 701 of the information preliminarily set by the management node 12 is a search key 715. Set values 716 include the destination DC code 702, the destination IP address 703, the destination port number 704, the destination priority command 705, the transfer amount transfer stop command 706, the transfer stop command for low 707, the transfer stop command for middle 708, and the transfer stop command for high 709. The status 717 includes the load information 710, the transfer amount 711, the packet analysis result priority 712, the transmission priority 713 and the transfer possibility 714.

This example has been described with respect to the set values 716 and the status 717 which constitute the single table structure. However, the set values and the status may be separated into a plurality of tables. The information indicating the status 717 may include the data value which has suppressed the packet transfer, and the information such as the packet length without being limited to those shown in FIG. 7. The destination priority command 705, the packet analysis result priority 712, the transmission priority 713, and the transfer stop commands for the respective transmission priorities (707-709) are described in three stages of low, middle and high. However, the method of setting the priority is not limited to the aforementioned example.

Figure 8:
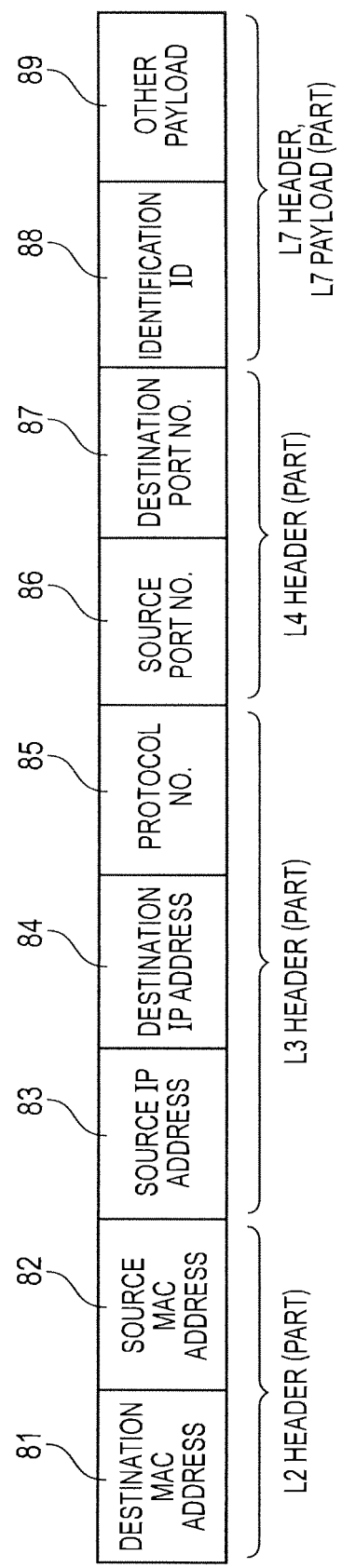
FIG. 8 is an explanatory view showing a packet format according to the first example.

FIG. 8 is an explanatory view showing an example of the packet format according to this example. The format shown in FIG. 8 only shows a part relevant to the system and units of this example, and omits other parts.

Referring to FIG. 8, a layer 2 (L2) header (part) as a data link layer includes an arrangement of a destination MAC address 81 and a source MAC address 82.

A layer 3 (L3) header (part) as a network layer includes an arrangement of a source IP address 83, a destination IP address 84, and a protocol number 85. The L3 header is used for routing the packet from the source IP address 83 to the destination IP address 84. The protocol number 85 is used to distinguish the protocol type of an L4. Referring to the flow decision table 509 shown in FIG. 6, explanation of the use of the protocol number 85 for determining the flow is omitted. The information from the L2 to L7 may be used for determining the flow as described above.

A layer 4 (L4) header as a transport layer includes an arrangement of a source port number 86 and a destination port number 87. The L4 header is used for indicating the application for communication. It may be configured to be used as the information for determining between those flows.

A layer 7 (L7) header as an application layer, or a L7 payload (part) includes an arrangement of an identification ID 88 and other payload 89. The identification ID 88 is an identifier for recognizing the access from a specific user and the information source. For example, such protocol as the hypertext transfer protocol (http) is employed for web data communication between the web browser and web server.

In explanation of this example, information on the source IP address 61, the source port number 62, and the identification ID 63 described referring to FIG. 6 corresponds to the source IP address 83, the source port number 86, and the identification ID 88 described referring to FIG. 8, respectively.

The information used for analyzing the packet sent to the gateway 14 is not limited to the one described, referring to FIGS. 6 and 8. It may include various types of information, for example, priority information and position information included in other payload 89 as described referring to FIG. 8, the information type such as sensor type, measurement data type and unit, or data values of temperature, voltage, current and water quantity.

Figure 9:
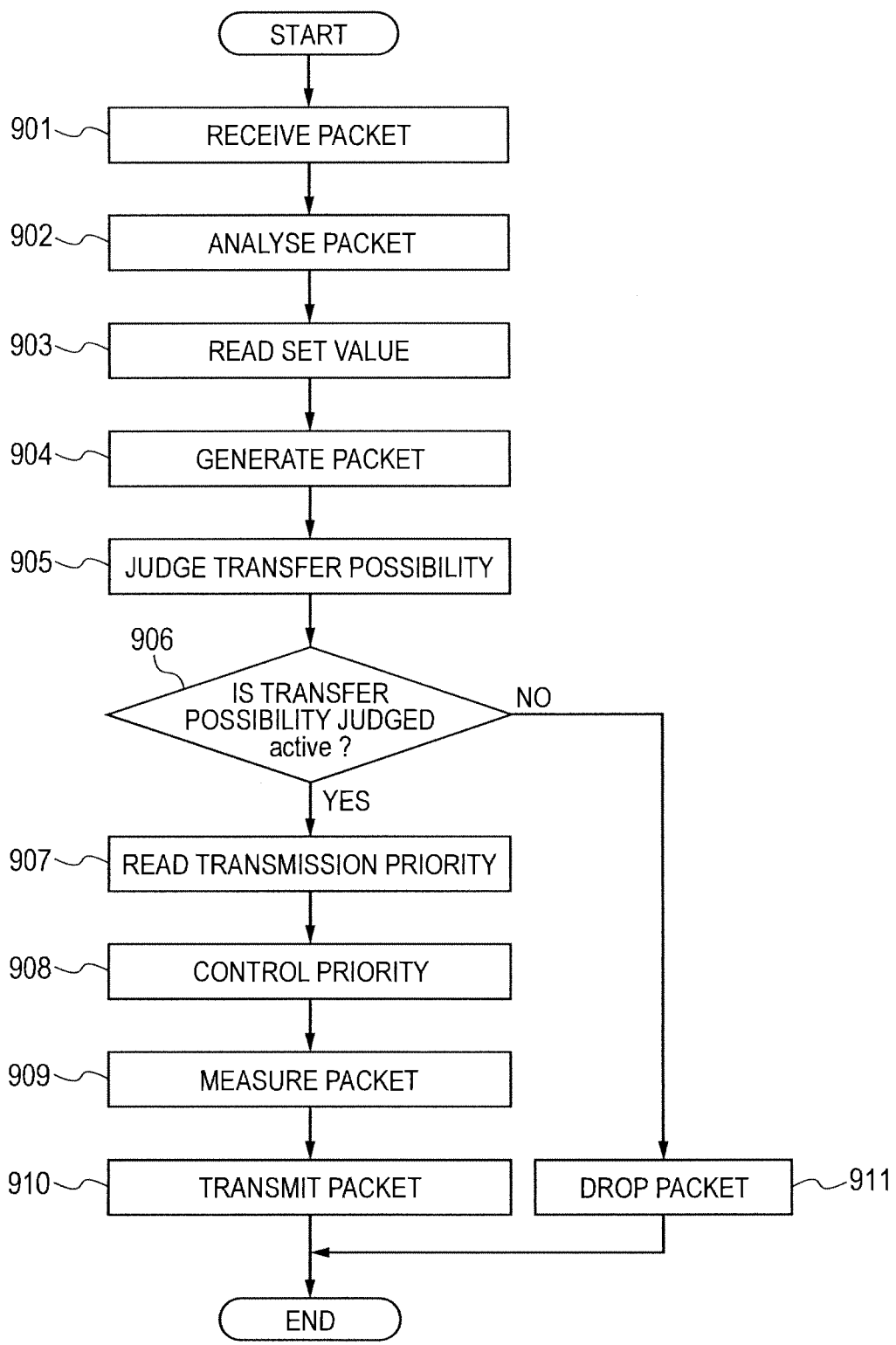
FIG. 9 is a flowchart of the process for controlling packets executed by the gateway according to the first example.

FIG. 9 is a flowchart showing an example of the process for controlling packets executed by the communication function section 31 of the gateway 14 according to the example.

In step 901, the communication interface input unit 501 receives incoming packets.

In step 902, the packet analyzer 502 analyzes the received packet based on the information of the flow decision table 509, and enters the priority based on packet analysis 65 in the field of the packet analysis result priority 712 of the transfer management table 510 so that the flow code 64 is carried over into step 903.

In step 903, the packet generator 503 searches entry of the flow code 64, taking the flow code 701 of the transfer management table 510 as the search key 715, and reads the set value 716. In step 904, the packet generator 503 generates the packet using such information as the destination DC code 702, the destination IP address 703, and the destination port number 704 of the transfer management fable 510.

In step 905, the transfer stop control unit 504 judges transfer possibility based on the transfer amount and priority, and enters the result into the transfer possibility 714 of the transfer management table 510. Details with respect to step 905 for judging transfer possibility will be described referring to FIG. 10.

In step 906, if a value of the transfer possibility 714 of the transfer management table 510 is judged "active", the transfer stop control unit 504 is subjected to the process in step 907. If the value is judged "stop", the process proceeds to step 911. In step 911, if the judgment result in step 906 is NO, the transfer stop control unit 504 drops the packet. Referring to FIG. 9, if the judgment result in step 906 is NO, the packet is dropped. However, the process may be held until the transfer possibility 714 of the transfer management table 510 is brought into "active" state without dropping packets. The packets are temporarily accumulated so that they are transmitted again using such devise as a timer. The storage devices such as the memory 35 of the gateway 14, hard disk connected to the I/O 36, and a solid state drive (SSD) may be used for temporarily accumulating the packets.

In step 907, the priority control unit 505 reads the transmission priority 713 of the transfer management table 510. Then in step 908, the priority control unit 505 controls transmission priority using the information on the transmission priority 713 that has been read in step 907. Details of the method of calculating the transmission priority 713 will be described referring to FIG. 11. In step 909, the packet measurement unit 506 measures the amount of packets for each destination, and writes the result into the transfer amount 711 of the transfer management table 510.

Finally, in step 910, the communication interface output unit 507 transmits the packet. Referring to FIG. 9, the packet generation step 904 is executed before execution of step 905 of judging transfer possibility. However, sequential order for executing steps is not limited, for example, step 904 may be executed after step 908 for controlling the priority. The packet generation step 904 is executed after priority control step 908 to allow omission of the process for generating the packet to be dropped.

Figure 10:
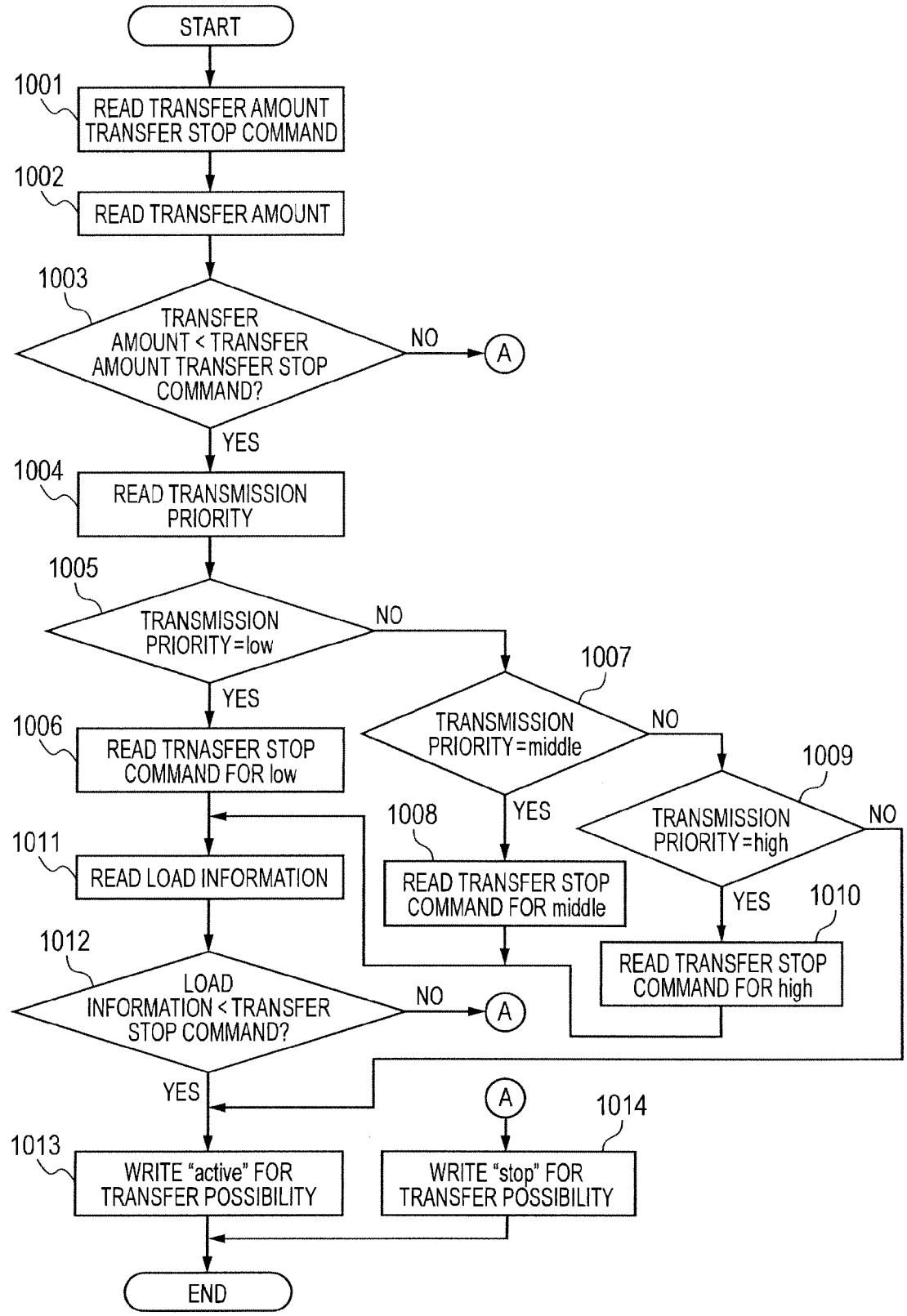
FIG. 10 is a flowchart of the process for judging transmission possibility executed by a transfer stop control unit of the communication function section according to the first example.

FIG. 10 is a flowchart of the process for judging transfer possibility executed by the transfer stop control unit 504 of the communication function section 31 according to the example, representing the aforementioned transfer possibility judgment step 905 as shown in FIG. 9 in detail.

In step 1001, the transfer stop control unit 504 reads the transfer amount transfer stop command 706 of the transfer management table 510. Then in step 1002, the transfer stop control unit 504 reads the transfer amount 711 of the transfer management table 510.

In step 1003, comparison is made between the transfer amount transfer stop command read in step 1001 and the transfer amount read in step 1002, and it is judged whether or not the transfer amount transfer stop command read in step 1001 is smaller than the transfer amount read in step 1002.

If it is judged in step 1003 that the command read in step 1001 is larger than the transfer amount read in step 1002, the transmission priority is read, and the process proceeds to step 1004.

If it is judged in step 1003 that the command read in step 1001 is smaller than the transfer amount read in step 1002, the process proceeds to step 1014, and "stop" is entered into the transfer possibility 714 of the transfer management table 510. The process then ends.

When the threshold value of the preliminarily set transfer amount transfer stop command 706 exceeds the actual transfer amount, the packet transfer may be suppressed. This ensures reduction in communication traffic volume of the network system. The packet transfer is suppressed by the adjacent gateway 14 provided with the device 16, the sensor 21 and the control object 22 so as to reduce communication traffic volume both of the wide area network 13 and the local network 15. If the processing executed by the destination data center 11 is brought into the overload state, it is possible to suppress unnecessary transmission of the packet sent to the data center 11, which is dropped owing to the overload state to the wide area network 13. This makes it possible to reduce communication traffic volume of the wide area network 13.

In step 1004, the transfer stop control unit 504 reads the transmission priority 713 of the transfer management table 510. Details of the method of computing the transmission priority 713 will be described referring to FIG. 11.

In step 1005, it is judged whether or not the transmission priority read in step 1004 is "low". If the transmission priority read in step 1004 is judged "low", the process proceeds to step 1006 where the transfer stop command for low 707 of the transfer management table 510 is read. If the transmission priority read in step 1004 is not "low", the process proceeds to step 1007 where it is judged whether or not the transmission priority read in step 1004 is "middle".

If the transmission priority read in step 1004 is "middle", the process proceeds to step 1008 where the transfer stop command for middle 708 of the transfer management table 510 is read. If the transmission priority read in step 1004 is not "middle", she process proceeds to step 1009 where it is judged whether or not the transmission priority read in step 1004 is "high".

If the transmission priority read in step 1004 is "high", the process proceeds to step 1010 to read the transmission stop command for high 709 of the transmission management table 510. If the transmission priority read in step 1004 is not "high", the process proceeds to step 1013 where "active" is entered into the transfer possibility, and the process end.

Referring to the flowchart shown in FIG. 10, if it is judged in step 1009 that the transmission priority read in step 1004 is not "high", the process proceeds to step 1013 to enter "active" into the transfer possibility, and the process ends. It is also possible that the process proceeds to step 1014 if the transmission priority read in step 1004 is not "high", and "stop" is entered into the transfer possibility to end the process.

In step 1011, the transfer stop control unit 504 reads the load information 710 of the transfer management table 510. The load information 710 is the value set via the management node 12. The method for setting such value will be described in detail referring to FIGS. 12 and 13.

In step 1012, a comparison is made between the load information read in step 1011 and the transfer stop command read in steps 1006, 1008 and 1010, and it is judged whether or not the load information read in step 1011 is smaller than the transfer stop command read in steps 1006, 1008 and 1010.

If it is judged in step 1012 that the toad information read in step 1011 is smaller than the transfer stop command read in steps 1006, 1008 and 1010, the process proceeds to step 1013 where "active" is entered into the transfer possibility, and the process ends.

If it is judged in step 1012 that the load information read in step 1011 is larger than the transfer stop command read in steps 1006, 1008 and 1010, the process proceeds to step 1014 where "stop" is entered into the transfer possibility. Then the process ends.

In this way, the packet transfer may be suppressed when the preliminarily set threshold values of the transfer stop commands for low, middle and high exceed the load information indicating the load of the destination, thus reducing communication traffic volume of the network system. That is, if the process executed by the data center 11 as the destination is brought into the overload state, it is possible to suppress unnecessary transmission of packets which are sent to the data center 11, and dropped owing to overload to the wide area network 13. This makes it possible to reduce the communication traffic volume of the wide area network 13. In view of transmission priority, it is possible to set the transfer stop command for each transmission priority. This ensures judgment whether or not the transfer is stopped for each transmission priority. The gateway is operated to suppress data volume in consideration of the processing load information of the destination so as to reduce the network communication traffic volume without suppressing the information with high severity.

The transmission priority and the transfer stop command for each transmission priority have been explained in three stages of "low", "middle" and "high". However, the method of setting the priority is not limited to the above-described example.

Figure 11:
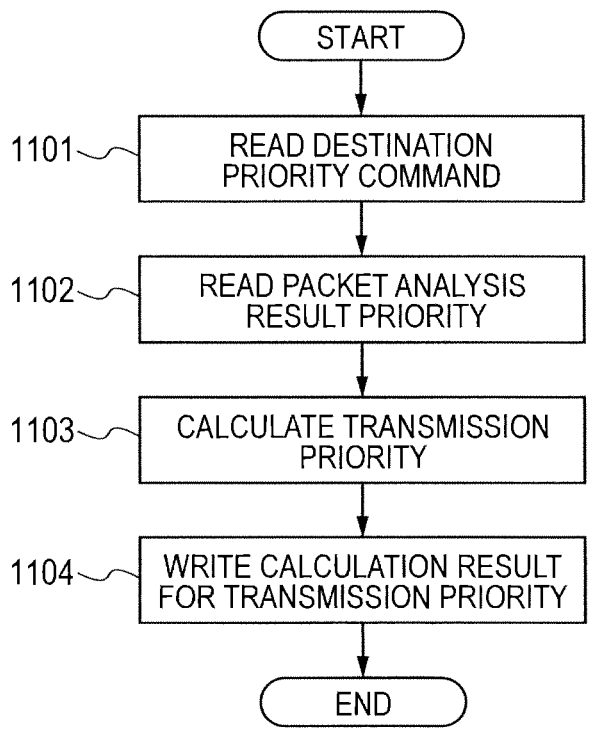
FIG. 11 is a flowchart of the process for judging transmission priority executed by a priority control unit of the communication function section according to the first example.

FIG. 11 is a flowchart showing an example of the process of calculating the transmission priority, which is executed by the priority control unit 505 of the communication function section 31 according to the example. The transmission priority 713 of the transfer management table 510 has the value determined by executing the process represented by the flowchart of FIG. 11.

In step 1101, the destination priority command 705 of the transfer management table 510 is read. Then in step 1102, the packet analysis result priority 712 of the transfer management table 510 is read.

In step 1103, the transmission priority is computed using the destination priority command 705 read in step 1101 and the packet analysis result priority 712 read in step 1102. In this example, the destination priority command 705 and the packet analysis result priority 712 use the numerals 1 to 3 in three stages. The number 1 denotes "low", 2 denotes "middle" and 3 denotes "high". In this example, the transmission priority is obtained through multiplication of values of the destination priority command 705 and the packet analysis result priority 712, and expressed as numerals 1 to 9 in nine stages. The range from 1 to 3 denotes "low", the range from 4 to 6 denotes "middle", and the range from 7 to 9 denotes "high".

In step 1104, the product obtained by calculation in step 1103 is entered into the transmission priority 713 of the transfer management table 510, and the process ends.

In this way, the network system according to this example is allowed to judge the transmission priority in consideration of the priority based on the packet analysis and the transfer priority required by the transfer destination. This makes it possible to reduce the network communication traffic volume without suppressing the information with high severity when the gateway suppresses data volume in view of the processing load information of the transfer destination.

FIG. 12 is a flowchart showing an example of the process for preliminarily setting the flow decision table 509 and the transfer management table 510, which are executed by the table control unit 508 of the communication function section 31 of the gateway 14 according to the example.

In step 1201, the table control unit 508 receives the preliminary set information on the flow decision table 509 and the transfer management table 510 from the management node 12. The preliminary set information includes the source IP address 61, the source port number 62, the identification ID 63 and the flow code 64 of the flow decision table 509, and the flow code 701, the destination DC code 702, the destination IP address 703, the destination port number 704, the destination priority command 705, the transfer amount transfer stop command 706, the transfer stop command for low 707, the transfer stop command for middle 708, and the transfer stop command for high 709 of the transfer management table 510.

In step 1202, the table control unit 508 enters the preliminary set information received in step 1201 into the flow decision table 509 and the transfer management table 510.

In step 1203, the table control unit 508 notifies the management node 12 of completion of entry into the flow decision table 509 and the transfer management table 510. Then the preliminary set process ends.

As described above, the management node 12 is allowed to preliminarily set the flow decision table 509 and the transfer management table 510.

FIG. 13 is a view showing an example of a sequence which allows the management node 12 to notify the gateway 14 of the set value according to the example.

The data center 11 measures the load information of the computing device that constitutes the data center (1301), and transmits the load information which includes the information capable of identifying the load information of the data center 11 (1302).

If the management node 12 receives the load information that includes the information capable of identifying the load information of the data center 11, the management node 12 executes the process for aggregating the load information of the data center 11 so as to be transmitted (1303), and transmits the set value to be set to the load information 710 of the corresponding entry to the transfer management table 510 (1304).

Upon reception of the set value, the gateway 14 rewrites the load information 710 of the corresponding entry to the transfer management table 510 based on the received load information (1305).

The management node 12 may be configured to obtain the load information by reading the load information of the computing device that constitutes the data center 11. The gateway 14 may be configured to obtain the set value by reading the load information of the data center 11, which has been aggregated by the management node 12.

FIG. 14 is a sequence diagram according to the example, representing an example of the process of reading the status 717 of the transfer management table 510 of the gateway 14, which is executed by the management node 12, and the process of rewriting the set value 716 of the transfer management table 510.

The management node 12 starts reading the status 717 registered in the transfer management table 510 which has been stored in the gateway 14 at a predetermined timing (1401), and transmits a status read command to the gateway 14 (1402). It is assumed that the status read command includes the information capable of identifying the entry for reading the status 717.

Upon reception of the status read command, the gateway 14 selects the entry included in the status read command from those registered in the transfer management table 510, and reads values of the selected entry, which are registered in the load information 710, the transfer amount 711, the packet analysis result priority 712, the transmission priority 713, and the transfer possibility 714 (1403). The gateway 14 transmits the read status 717 to the management node 12 (1404).

Upon reception of the status, the management node 12 executes the command change judgment process for judging whether or not the command is changed based on the received status (1405). In the command change judgment process, various processes are executed dependent on the usage. For example, the process is executed to compare values of the transfer amount transfer stop command 706, transfer stop commands for low 707, for middle 708, and for high 709 with those of the transfer amount and the load information 710 indicated by the status 717.

This makes it possible to change the command based on the judgment whether or not setting of the transfer management table 510 is appropriate, or to change the condition for stopping the transfer based on the priority. Accordingly, the management node 12 is allowed to rewrite the set value 716 of the transfer management table 510 of the gateway 14.

If it is judged in the command change judgment process 1405 that the command is required to be changed, the management node 12 transmits an instruction for rewiring the command, instructing to rewrite the command registered in the transfer management table 510 of the gateway 14 (1406). It is assumed that the instruction for rewriting command includes the information capable of identifying the entry for rewriting the command, and the updated command.

Upon reception of the instruction for rewriting command, the gateway 14 rewrites the command registered in the transfer management table 510 based on the received instruction for rewriting command (1407). Specifically, the gateway 14 selects the entry included in the instruction for rewriting command from those registered in the transfer management table 510 based on the identifiable information, and rewrites values registered in the destination priority command 705, the transfer amount transfer stop command 706, and transfer stop commands for low 707, for middle 708, and for high 709 of the selected entry.

Upon rewriting of the command, the gateway 14 transmits a rewrite completion notice to the management node 12 (0108).

In this way, the management node 12 judges whether or not the currently set command is appropriate based on the information concerning the packet actually processed by the gateway 14, and is allowed to change the command if the command is not appropriate. This makes it possible to keep the command in an appropriate state.

In this example, the management node 12 is configured to have the information capable of identifying the entry for reading the status included in the status read command. However, it is possible to read all the entries for the status registered in the transfer management table 510 stored in the gateway 14. For example, the management node 12 transmits the status read command which includes information indicating that all the entries registered in the transfer management table 510 are read to the gateway 14. The gateway 14 then reads values registered in the load information 710, transfer amount 711, packet analysis result priority 712, transmission priority 713, and the transfer possibility 714 of all the entries as statuses, and transmits the read statuses to the management node 12. Thereafter, the management node 12 judges whether or not the command is changed for each of the read entries. Then the instruction for rewriting command for the entries which need to be changed may be transmitted.

In the sequence (1401) for starting the status reading, the explanation is made that the management node 12 is configured to start the processing at a predetermined timing. However, it is possible to allow owners and managers of the data center 11, the gateway 14, or the device 16 of the network system shown in FIG. 1 to start the sequence (1401) for starting the status reading using the management node 12.

It is possible to allow the management node 12 to read the status (1404) read from the gateway 14 by owners and managers of the data center 11, the gateway 14 and the device 16 in the sequence (1405) for judging change in the command so that it is preliminarily judged whether or not setting of the transfer management table 510 is appropriate, and then the command is changed.

Figure 15:
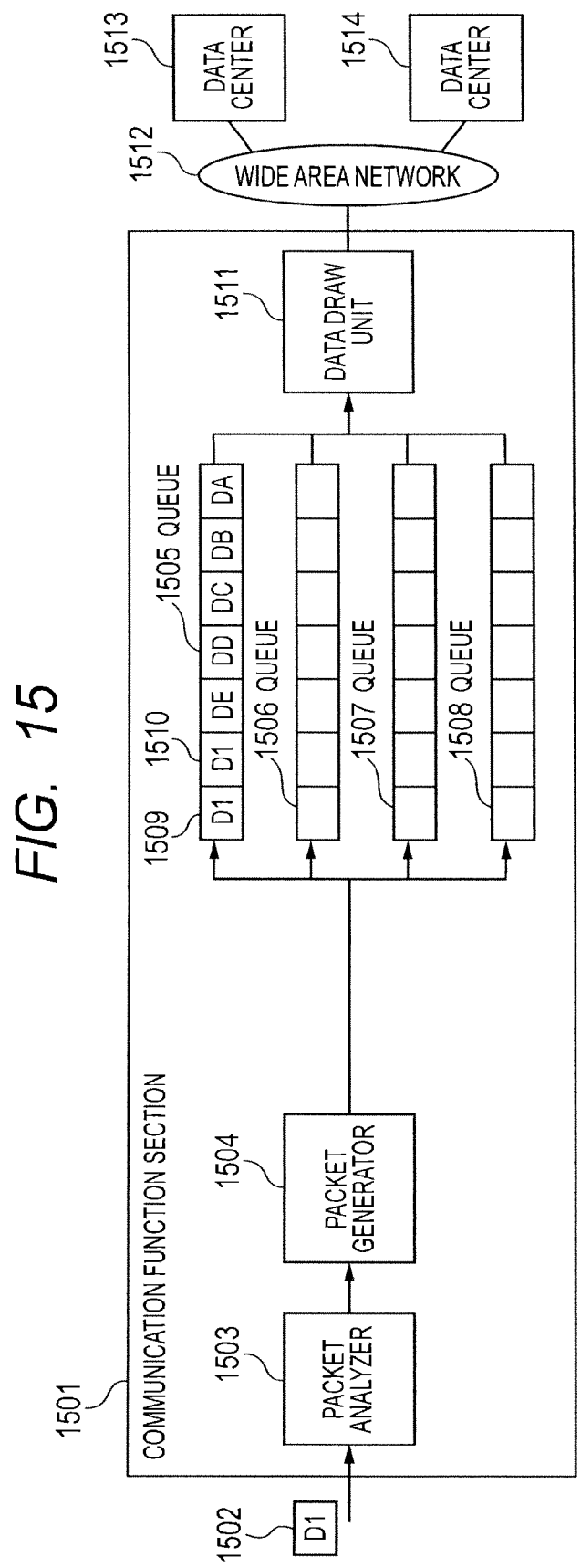
FIG. 15 is an explanatory view showing a flow of the packet of the gateway according to the first example.
Figure 16:
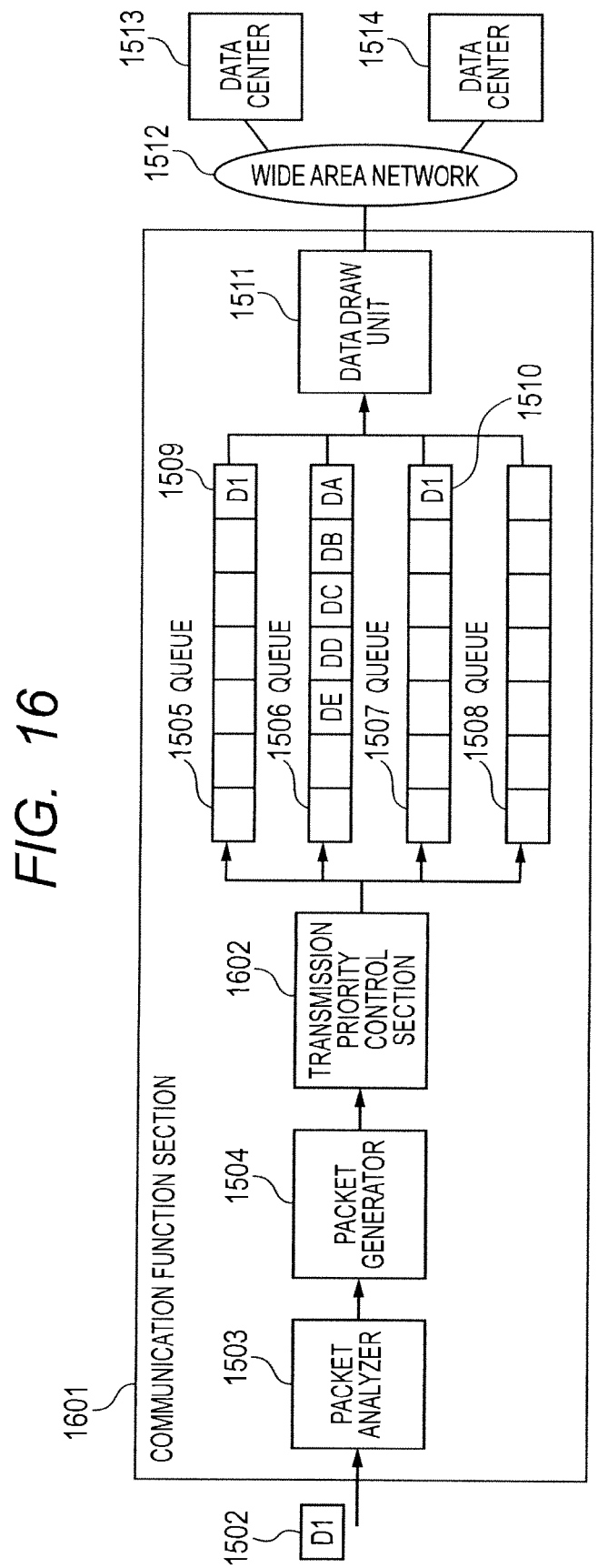
FIG. 16 is an explanatory view of a modified example representing the flow of the packet of the gateway according to the first example.

Referring to FIGS. 15 and 16, a flow of the packet in the gateway 14 according to the example will be described. In the explanation referring to FIG. 5, the functional structure of the communication function section 31 of the gateway 14 has been described in detail. In this explanation, the flow of packets of queues 1505 to 1508 in the communication function sections 1501 and 1601 will be described in detail using values registered in the transmission priority 713 of the transfer management table 510 which is omitted in FIGS. 15 and 16. The flow will be described using the simple structure indicating a plurality of parallel queues as FIGS. 15 and 16 show. Explanation of the functional structures except those shown in the drawings is omitted. For example, the drawing omits to show the communication interface input unit 501, the transfer stop control unit 504, and the packet measurement unit 506.

Referring to the structure shown in FIG. 15, the communication function section 1501 includes a packet analyzer 1503, a packet generator 1504, queues 1505 to 1508 for sequentially controlling the packets, and a data draw unit 1511. The data draw unit 1511 of the communication function section 1501 is connected to at least two data centers 1513 and 1514 via a wide area network 1512. The data draw unit 1511 may be configured as a function of the communication interface output unit 507 as shown in FIG. 5.

A packet D1 (1502) is sent to the communication function section 1501 so as to be analyzed by the packet analyzer 1503 corresponding to the packet analyzer 502 as described referring to FIG. 5. The analytical result is taken over to the packet generator 1504.

The packet generator 1504 generates the packet transferred to at least two data centers 1513 and 1514 by duplicating the packet D1 (1502) based on the analytical result of the packet analyzer 1503.

It has been already explained that the packet generator 1504 is capable of extracting the priority based on the analytical result of the packet analyzer 1503 referring to FIGS. 5 and 6. As for the structure shown in FIG. 15, the extracted priority is only the one derived from the information included in the packet. The same priority information is used for generating the packet to be transferred to at least the two data centers 1513 and 1514.

The packet D1 (1509, 1510) duplicated by the packet generator 1504 are sent to the same priority queue 1505. Referring to the structure of the communication function section 1501 shown in FIG. 15, the queue 1505 is intended to be transferred with higher priority, and the queue 1508 is intended to be transferred with lower priority. The description of this explanation will be made that four queues 1505 to 1508 are transferred with four-stage priority, and there are packets DA to DE in the queue 1505.

In this way, the queue 1505 includes the packets DA to DE, and the packets D1 (1509, 1510) obtained by duplicating the packet D1 (1502) in the queue 1505 so as to be transferred with higher priority.

The data draw unit 1511 draws the packet from the queues 1505 to 1508, and the drawn packet is transmitted to the data centers 1513 and 1514 as the destinations via the wide area network 1512.

The communication function section 1601 shown in FIG. 16 is different from the structure shown in FIG. 15 in that a transmission priority control unit 1602 for controlling the transmission priority is further added to the communication function section 1501 described referring to FIG. 15. Any other structures are the same as those described referring to FIG. 15, and explanations of the same structure, thus, will be omitted.

Referring to FIG. 16, the packet generator 1504 is capable of extracting the priority based on the analytical result of the packet analyzer 1503 as described above. The duplicated packet is sent to the transmission priority control unit 1602.

The transmission priority control unit 1602 of the communication function section 1601 executes the same process as the one executed by the priority control unit 505 as described referring to FIG. 5 together with the queues 1505 to 1508. Specifically, the process for judging the transmission priority is executed as described referring to FIG. 11. The transmission priority is determined in consideration of the priority based on the packet analytical result that has been analyzed by the packet analyzer 1503 and extracted, and the priority command for each required by the transfer destination.

The packet D1 (1502) sent to the communication function section 1601 is subjected to the process for generating and duplicating the packet executed by the packet generator 1504, and subjected to the transmission priority process executed by the transmission priority control unit 1602 so as to sort the packets D1 (1509) and D1 (1510) into the different queues 1505 and 1507, respectively.

The communication function section 1601 shown in FIG. 16 is configured to ensure suppression of the packet retained in the queue of the communication function section 1601 in consideration of the priority based on the packet analytical result and the priority command for each destination required by the transfer destination.

Cloud service for social infrastructure has been considered for supplying appropriate information and services based on results of monitoring in accordance with the information concerning regional events such as environment, weather, disaster prevention, and crime prevention. In order to realize the cloud service, it has been thought that use of information on the sensor installed on site shared by a plurality of cloud services ensures cost reduction compared with individual provision of sensors for the respective purposes of the service. Compared with reception/transmission of the predetermined information between the cloud services, transfer of the sensor information to the appropriate cloud service by the network system through autonomous interpretation of such information is thought to allow the sensor information to be shared without using particular means for the application. This system is required to prevent increase in communication traffic volume on the network and increase in the information processing load by transferring the packet to a plurality of destinations when sharing the information among the cloud services. Accordingly, the present invention is suitable for the above-described network system.

The present invention is not limited to the explanation as described above, and may include various modified examples. For example, the explanation has been made in detail for the purpose of easy comprehension of the present invention, but is not intended to limit the invention to include all the structures as described above. The network system to which the above explanation has been applied is configured via the wide area network. However, the present invention is applicable to the closed system of the local network. The function of the management node may be performed by the management program executed by the data center without using the management node.

The aforementioned structures, functions, processing parts and the processing units may be partially or entirely designed using the integrated circuit, for example so as to be realized by hardware. The respective structures and functions are executed by the process that interprets the programs for realizing those functions through software. However, it is also possible to store the information such as the program for realizing the respective functions, tables, files not only in the memory but also the recording device such as hard disk, and Solid State Drive (SSD), or the recording medium such as IC card, SD card and DVD. It is also possible to download and install the information via the network if needed.

The invention claimed is:

1. A network system comprising a data center as a destination and a gateway on a network,
   wherein the gateway comprises a processor and a memory,
   wherein the memory includes a transfer management table which stores for each flow at the destination:
   a first priority which is a transmission priority required by the destination;
   a second priority based on an analysis result of receiving a packet;
   a third priority determined by the first priority and the second priority;
   a plurality of transfer stop commands corresponding to the third priority;
   a transfer amount transfer stop value which is a threshold for transfer stop of the packet;
   a load information value which indicates a processing load at the destination; and a transfer amount which indicates a packet amount transferred to the destination, and wherein the processor is configured to:
read the transfer amount transfer stop value and the transfer amount from the transfer management table;
when the transfer amount is smaller than the transfer amount transfer stop value, read the third priority from the transfer management table;
read the transfer stop commands corresponding to the read third priority from the transfer management table;
read the load information value from the transfer management table;
when the load information value is larger than the transfer stop command corresponding to the read third priority, suppress transfer of the packet; and
when the load information value is smaller than or equal to the transfer stop command corresponding to the read third priority,
read the first priority and the second priority from the transfer management table;
determine a new third priority by multiplying the first priority and the second priority;
write the new third priority in the transfer management table; and
transfer the packet based on the new third priority.

2. A gateway connected to a destination via a network, comprising a storage unit and a processing unit,
wherein the storage unit includes a transfer management table which stores for each flow at the destination:
a first priority which is a transmission priority required by the destination;
a second priority based on an analysis result of receiving a packet;
a third priority determined by the first priority and the second priority;
a plurality of transfer stop commands corresponding to the third priority;
a transfer amount transfer stop value which is a threshold for transfer stop of the packet;
a load information value which indicates a processing load at the destination; and
a transfer amount which indicates a packet amount transferred to the destination, and
wherein the processing unit is configured to:
read the transfer amount transfer stop value and the transfer amount from the transfer management table;
when the transfer amount is smaller than the transfer amount transfer stop value, read the third priority from the transfer management table;
read the transfer stop commands corresponding to the read third priority from the transfer management table;
read the load information value from the transfer management table;
when the load information value is larger than the transfer stop command corresponding to the read third priority, suppress transfer of the packet; and
when the load information value is smaller than or equal to the transfer stop command corresponding to the read third priority,
read the first priority and the second priority from the transfer management table;
determine a new third priority by multiplying the first priority and the second priority;
write the new third priority in the transfer management table; and
transfer the packet based on the new third priority.

3. A packet delivery method for a network system comprising a destination of a packet, a management node, and a gateway, connected via a network, the method comprising:
storing, by the gateway, in a transfer management table:
a first priority which is a transmission priority required by the destination;
a second priority based on an analysis result of receiving a packet;
a third priority determined by the first priority and the second priority;
a plurality of transfer stop commands corresponding to the third priority;
a transfer amount transfer stop value which is a threshold for transfer stop of the packet;
a load information value which indicates a processing load at the destination; and
a transfer amount which indicates a packet amount transferred to the destination;
reading, by the gateway, the transfer amount transfer stop value and the transfer amount from the transfer management table;
when the transfer amount is smaller than the transfer amount transfer stop value, reading, by the gateway, the third priority from the transfer management table;
reading, by the gateway, the transfer stop commands corresponding to the read third priority from the transfer management table;
reading, by the gateway, the load information value from the transfer management table;
when the load information value is larger than the transfer stop command corresponding to the read third priority, suppressing, by the gateway, transfer of the packet; and
when the load information value is smaller than or equal to the transfer stop command corresponding to the read third priority,
reading, by the gateway, the first priority and the second priority from the transfer management table;
determining, by the gateway, a new third priority by multiplying the first priority and the second priority;
writing, by the gateway the new third priority in the transfer management table; and
transferring, by the gateway, the packet based on the new third priority.

* * * * *